United States Patent
McCoy et al.

(10) Patent No.: US 10,158,915 B2
(45) Date of Patent: Dec. 18, 2018

(54) METHOD AND APPARATUS FOR IDENTIFYING CONTENT USING IPTV DEVICES

(71) Applicants: Sony Corporation, Tokyo (JP); Sony Interactive Entertainment LLC, San Mateo, CA (US)

(72) Inventors: Charles McCoy, Coronado, CA (US); Ling Jun Wong, Escondido, CA (US); True Xiong, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/489,058

(22) Filed: Apr. 17, 2017

(65) Prior Publication Data

US 2017/0230714 A1    Aug. 10, 2017

Related U.S. Application Data

(63) Continuation of application No. 13/077,656, filed on Mar. 31, 2011, now Pat. No. 9,628,842.

(Continued)

(51) Int. Cl.
*H04N 21/45*    (2011.01)
*H04N 21/643*    (2011.01)
(Continued)

(52) U.S. Cl.
CPC ..... *H04N 21/4532* (2013.01); *H04N 21/4302* (2013.01); *H04N 21/44222* (2013.01);
(Continued)

(58) Field of Classification Search
None
See application file for complete search history.

(56) References Cited

U.S. PATENT DOCUMENTS

| 7,185,355 B1 | 2/2007 | Ellis et al. |
| 2002/0059610 A1 | 5/2002 | Ellis |

(Continued)

FOREIGN PATENT DOCUMENTS

| CN | 1309867 A | 8/2001 |
| CN | 101031028 A | 9/2007 |

OTHER PUBLICATIONS

Office Action issued in corresponding Chinese application No. 201210021351.1 dated Jan. 24, 2014 and the English translation.

*Primary Examiner* — Nicholas T Corbo
(74) *Attorney, Agent, or Firm* — Haug Partners LLP; William S. Frommer (57) ABSTRACT

A method and apparatus for identifying content using one or more Internet Protocol Television (IPTV) devices by accessing a user's account using a secondary device and selecting content provided by a service provider. The service provider sends an identifier that specifies the selected content to a first IPTV device that will display content. The selected content is added to a user's content list in the user's account; and played on the first IPTV device. During the time of playback on the first IPTV device, the user is able to browse content using the secondary device or another IPTV device. Thus, the user is able to browse and search for additional content without disturbing the display of the selected content.

20 Claims, 8 Drawing Sheets

Related U.S. Application Data

(60) Provisional application No. 61/442,033, filed on Feb. 11, 2011.

(51) Int. Cl.
| | |
|---|---|
| *H04N 21/4627* | (2011.01) |
| *H04N 21/858* | (2011.01) |
| *H04N 21/442* | (2011.01) |
| *H04N 21/466* | (2011.01) |
| *H04N 21/43* | (2011.01) |

(52) U.S. Cl.
CPC ..... *H04N 21/4627* (2013.01); *H04N 21/4668* (2013.01); *H04N 21/64322* (2013.01); *H04N 21/8586* (2013.01)

(56) References Cited

U.S. PATENT DOCUMENTS

| | | |
|---|---|---|
| 2002/0077880 A1 | 6/2002 | Gordon et al. |
| 2003/0115274 A1* | 6/2003 | Weber ............... H04L 29/06027 709/206 |
| 2003/0229900 A1* | 12/2003 | Reisman ........... G06F 17/30873 725/87 |
| 2005/0028208 A1* | 2/2005 | Ellis ...................... H04N 7/163 725/58 |
| 2006/0064644 A1 | 3/2006 | Joo |
| 2008/0052742 A1 | 2/2008 | Kopf et al. |
| 2008/0155613 A1 | 6/2008 | Benya et al. |
| 2009/0133069 A1 | 5/2009 | Conness et al. |

\* cited by examiner

METHOD AND APPARATUS FOR IDENTIFYING CONTENT USING IPTV DEVICES

CLAIM TO PRIORITY

This application claims the benefit of previously filed provisional application U.S. Ser. No. 61/442,033 filed Feb. 11, 2011, which is hereby incorporated by reference in its entirety herein.

BACKGROUND

1. Field of the Invention

This invention relates generally to a system and method of controlling one device capable of accessing Internet Protocol Television (IPTV) using a second device and more specifically to identifying assets across a plurality of IPTV devices.

2. Background Discussion

An IPTV system is capable of receiving services delivered using the architecture and networking methods of the Internet Protocol Suite. IPTV services include, for example, live television, time-shifted programming, video on demand (VOD), and on-line transactions.

Typically, a user's library of favorite assets, such as data, content and other information, is tied to a particular IPTV device. This is less than desirable and may result in an unfavorable user experience for managing and synchronizing the library.

SUMMARY

One embodiment of the present invention is directed to a method and apparatus for facilitating a user's management of his/her list of assets (queue or favorite content) across all the IPTV devices that he/she has access to. This helps the user manage individual lists which may be updated individually and hence become different or unsynchronized, which causes the lists to not be uniform. Having one common list not only keeps the list clean for users to browse, but also makes the list easier for users to share and recommend assets to one another. This also allows users to subscribe to another user's list. This also benefits the user with an enhanced user experience and benefits a hosting device, such as a server, that can use a more simple and cleaner design.

According to another embodiment of the present invention, the method further includes a list for the IPTV client devices (also referred to herein as "IPTV device" and/or "IPTV client" and/or "IPTV device") to include content from service providers, so that the listed contents are dynamic.

According to yet another embodiment of the present invention, the method further manages content across different service providers where authentication and other details for identifying that asset are used.

Another embodiment of the present invention is directed to a method for identifying content using one or more IPTV devices, ("the method"), which includes accessing a user's account using a secondary device (also referred to as a "second device" and/or "secondary display device" herein) and selecting content provided by a service provider. The service provider sends an identifier that specifies the selected content to a first IPTV device that will display content, and the identifier is added to a user's content list in the user's account. Meta-data, such as title, description, and rating, is included with the identifier in the item in the user's content list so that the list item can be presented to the user using only the information from the list. The thumbnail for that item may be downloaded by the secondary device from the service provider when it is shown to the user, but the uniform resource locator (URL) for that would be included in the meta-data. For example, the meta-data can include a "notes" or "comments" field in which the user can enter and edit his own text for that item. The term "content reference" might be used to describe the combination of identifier and meta-data that is stored for each list item. During the time of playback on the first IPTV device, the secondary device or another IPTV device is operable to browse further content. Thus, the user is able to browse and search for additional content without disturbing the display of the selected content. Furthermore, a user is able to add selected content to the user's content list and at a later time, play the selected content on a desired display device. Thus, the user may select content and then play the selected content at a later time and/or utilizing a different device.

Another embodiment of the present invention is directed to the method described above and also includes using the secondary device to select the first IPTV device. The first IPTV device is selected from a plurality of IPTV devices associated with the user's account and is used to play the selected content.

Another embodiment of the present invention is directed to the method described above and also includes determining whether the selected content is viewable by the selected IPTV device. For example, when there are regional or country restrictions, or rating limit restrictions, or when hardware or software is needed to support a particular codec, the selected content might not be playable on a particular IPTV device.

Another embodiment of the present invention is directed to the method described above wherein each of the IPTV devices and the secondary device supports a plurality of languages. The set of languages supported by each IPTV device and each secondary device may be different.

Another embodiment of the present invention is directed to the method described above wherein the user selects one or more preferred languages to be used on each of the IPTV devices and the secondary device.

Another embodiment of the present invention is directed to the method described above wherein the content list is a list of content included in the user's content list and available on each of the IPTV devices. Alternatively, items on the user's content list may not be available on IPTV devices in which that item is not playable.

Another embodiment of the present invention is directed to the method described above and also includes identifying previous selections associated with the user's account. For example, the previous selections may include selections a user may have made in the past. A user may use a history list to navigate back to an item that has been viewed recently on the same IPTV device or a different IPTV device.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules or facilities. The processing devices, or modules, or facilities, may be coupled such that portions of the processing and/or data manipulation may be performed at one or more processing devices and shared or transmitted between a plurality of processing devices.

IPTV provides the ability to integrate different functions or different applications into a single control device to control multiple assets. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user manipulating (e.g., browsing, searching, displaying, pausing, playback, or other operation) content on a second device to have their selection played by a first device. The user can then continue to manipulate the content on any number of second devices without interrupting the content that is playing on the first device. The first device may be an IPTV device. The second device may be another electronic device. The method includes an architecture design and implementation that allows a user to navigate, browse, and search content on a second device that may be a consumer electronic device such as a Sony Ericsson® smart phone, VAIO® PC, VAIO® laptop, Mylo®, personal computer, or other apparatus with sufficient processing and storage capability, or any device with a web browser. Concurrently, while a user is using the first device, another user can perform these activities on the second device and send a media selection to the first device of the user's choice for playback.

A second device, also referred to as a secondary device and/or a secondary display device, which may include an associated display module, for displaying data, performs manipulations, such as searching, content playback, browsing (when operable with a web browsing application) and may act as a visual aid to the IPTV device. The second device can execute a program that allows the second device to act as the visual aid. The capability of the second device being used as a visual aid may be useful for searching and browsing through available content lists. A second device that has a pointing device, such as a mouse or touch screen, or track ball, creates a more natural user interface for searching and browsing than a user interface on an IPTV device that does not have a pointing device. It is a low cost solution which opens up a huge window of business and technical opportunities. It is a favorable complement to the IPTV because the device has strengths in data entry, processing power and user experience in content management. Thus, users will be able to use their personal devices, such as a cellphone, to manipulate data, such as to browse content in their own language, perform data entry, search for content, manage their content, perform transactions and personalize their experience without disturbing the big screen of a first device. Users only send the content for playback on the IPTV when they are ready to watch it; and playback of proprietary content does not occur on the non-authentic device so security risks are minimized. The program may be written in any suitable language, such as JavaScript, HTML, or other language with the desired functionality, which can be loaded by any device with a browser or an application written in languages which may not be run in a web browser, such as C, C++, Java, etc., hence not limited to only a small set of compatible devices.

An IPTV system typically includes an IPTV client device that includes a display and a processor, for controlling a video display of content on the IPTV client device. The system also includes a second device (also referred to as a secondary device and/or a secondary display device, which may or may not have a display unit) including a control processor and a management server communicating with the IPTV client device over the Internet. The management server and IPTV client device communicate with at least one content server such that the content server provides audio video content to the IPTV client device for presentation of the content on the video display of the IPTV client device. The system further includes a proxy server communicating with the management server and the second device. Alternatively, the proxy server may return an executable utility to the second device. Yet another embodiment provides that the second device will communicate to the IPTV client device through an external server. The IPTV client sends login information to the management server which returns to the IPTV client an IPTV session token that is subsequently presented by the IPTV client device to a the content server to obtain content from the content server. The management server receives and stores a local IP address of the IPTV client device or an external IP address of the IPTV client device, which may include, for example Uniform Resource Indicator (URI) or Uniform Resource Locator (URL) or a network location or network address. The management server can also store an external IP address, which allows communication from a secondary device, which is outside the network, to the IPTV device. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

Embodiments include the IPTV client requests of the management server information about the selection received from the second device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a service login received from the second device may be sent by the IPTV client to the content server and a service token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of content so that unauthorized distributions of content are effectively prevented.

According to an embodiment of the present invention, a consumer electronic device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

According to an embodiment of the present invention, a proxy server assembly includes at least one processor and at least one network interface communicating with the processor to establish communication between the processor and a wide area network.

According to an embodiment of the present invention, at least one computer readable storage medium is accessible to the processor and bears logic causing the processor to receive login information from a second device. Responsive to a determination that the login information is correct, the server sends to the second device a local IP address of an IPTV client associated with the login information. The server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests a service login of the content server. The proxy server receives back from the content server a list of assets or categories or services and sends the list to the second device. In this way, the list can be presented on a video display of the second device so that a user can navigate to enter a selection to command the IPTV client to play the selection.

According to an embodiment of the present invention, a first device is connected with a plurality of electronic devices. A second device may transmit control commands to the first device using a communication network or internet to control the plurality of electronic devices.

Figure 1:
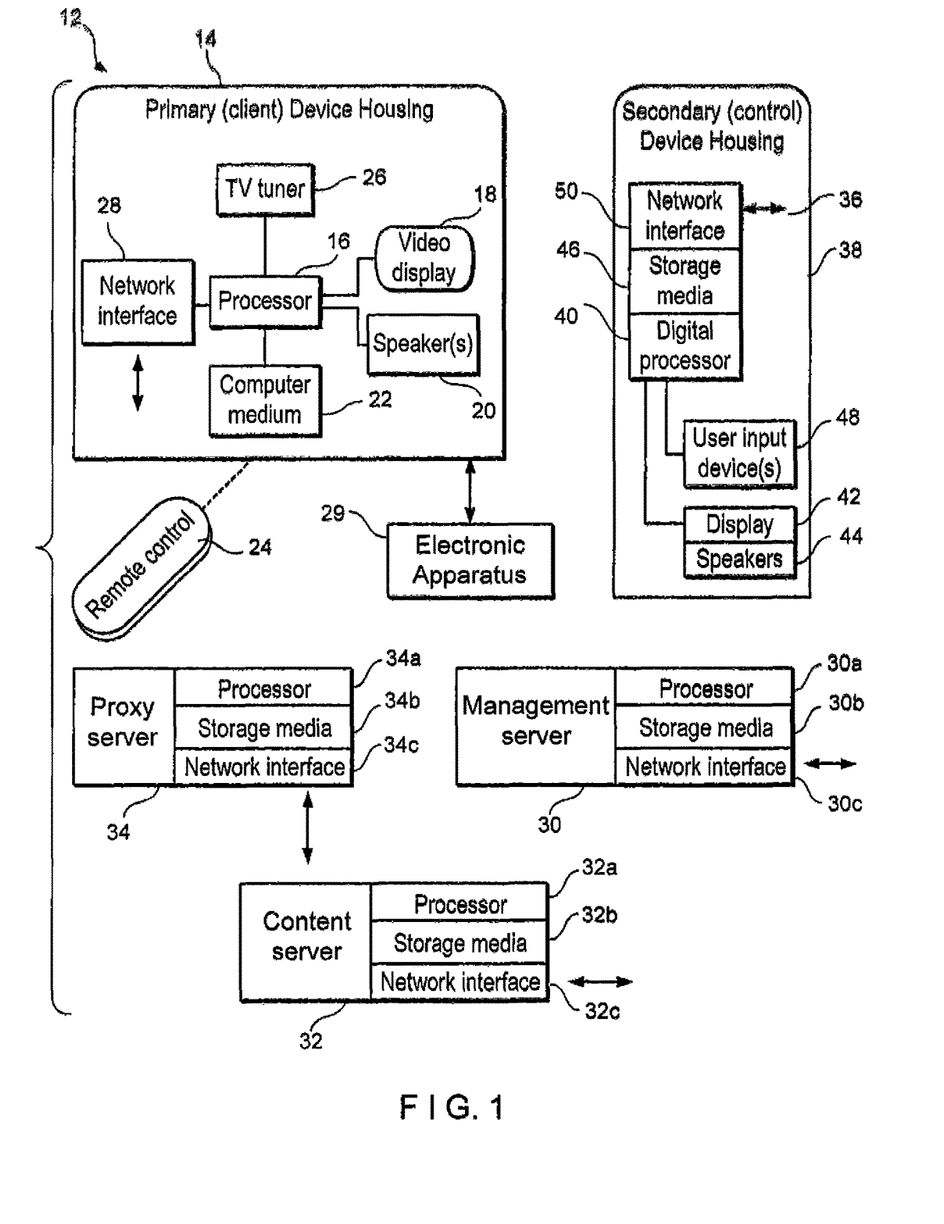
FIG. 1 shows a block diagram of one embodiment of the present invention.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have both a wired communication interface and a wireless communication interface.

The client consumer electronics device (CE) 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The client consumer electronics has a unique identifier that, without other means, is able to identify the client consumer electronics within the IPTV system. The unique identifier may be assigned by a manufacturer or assigned by the management server when the client consumer electronics is registered in the IPTV system.

To undertake present principles, the processor 16 may access one or more computer readable storage media 22 such as but not limited to RAM-based storage (e.g., a chip implementing dynamic random access memory (DRAM) or flash memory or disk-based-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, and 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device is connected with the first device 12 using a cable such as a 1394 cable or a HDMI cable or using a wireless communication interface such as infrared signals. The electronic device may be a digital video recorder, a blue-ray player, a game player, an audio amplifier, or an air conditioner. Storage may be any suitable electronic storage, such as RAM, ROM, EEPROM, or other storage medium, or cloud-based storage using local storage or local storage or remote storage via a network, such as storage at a remote server.

A second device 36 may be another consumer electronics device. The second device 36 may be another TV, game player, video disk player, camera, digital clock radio, mobile telephone, personal digital assistant, laptop computer, etc. The second device 36 with a housing 38 bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2A:
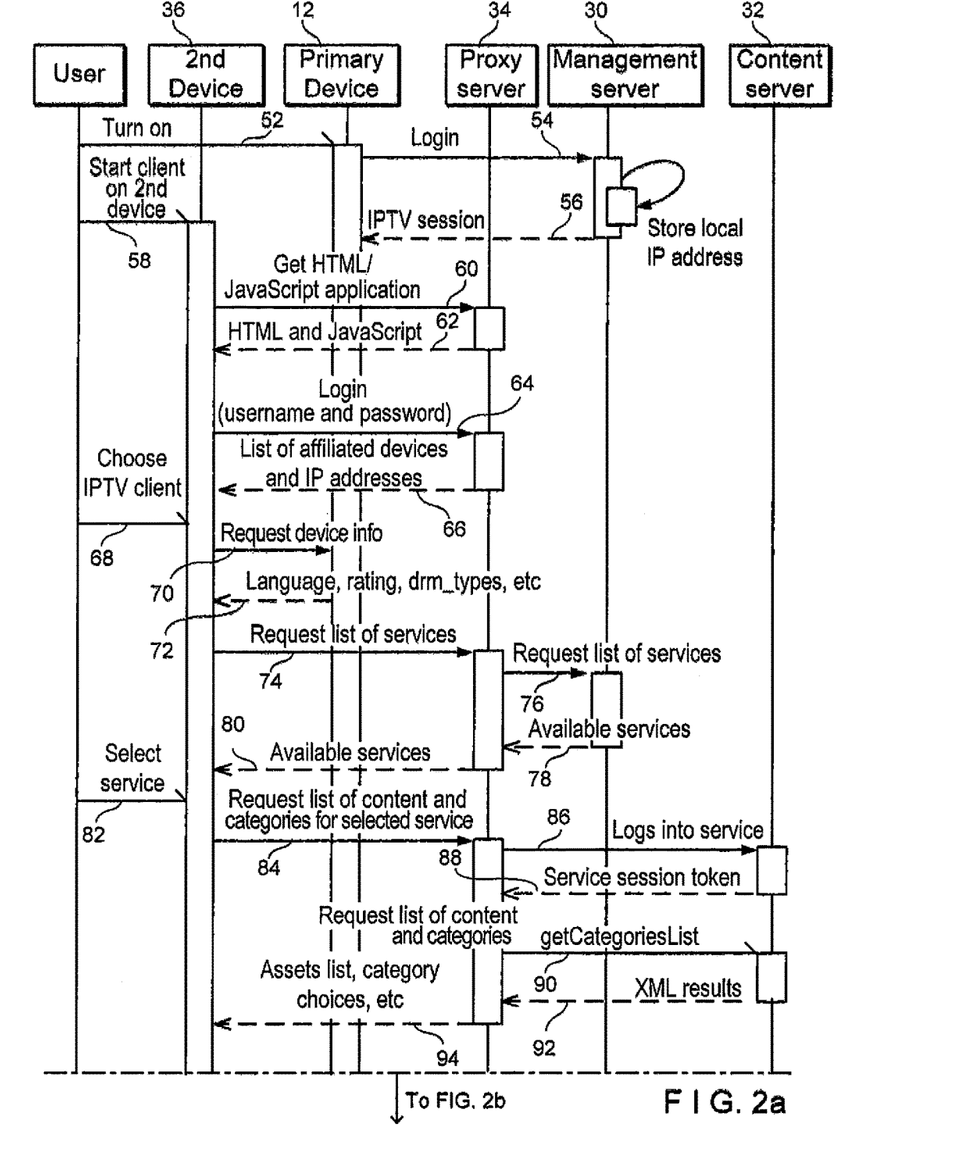
FIGS. 2A and 2B show a series of steps according to an embodiment of the present invention.
Figure 2B:
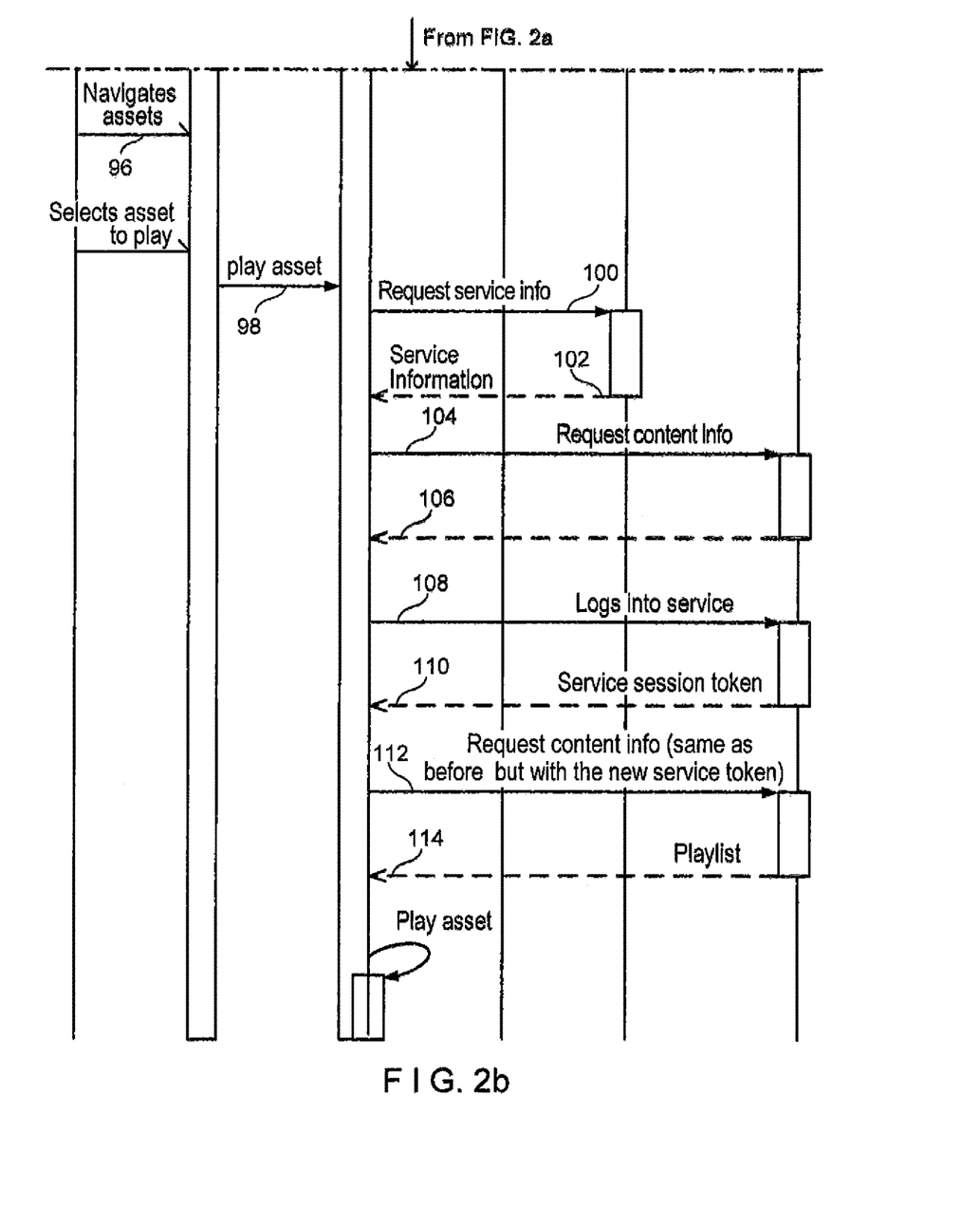

FIG. 2 shows an example embodiment of present principles for enabling a user to use a second device 36 to browse assets and select one to have a first device 12 such as a main IPTV client play the content (the IPTV client is also referred to as an IPTV client device and/or an IPTV device and/or IPTV herein). FIG. 2 assumes that the user has already created an account with the management server 30 and has affiliated the main IPTV device with that account. In general, a user loads the application in the second device and logs into their user account, which may be the same account used for device registration. Once logged in, a list of compatible IPTV devices is presented. After the user selects a device, a list of services that the device is entitled to is provided. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for command execution (i.e., playback) in the form of a reference id which is used by the IPTV to retrieve content information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client device to a participating content server 32 to obtain content from that server. Also, the management server 30 stores the local location (IP address or IP address and port number) of the IPTV client device 12. Alternatively, in another embodiment, the management server 30 does not return a token in response to receiving login information. Subsequently, no token is required to be presented by the IPTV client device to the participating content server 32 to obtain content.

At state 58, the user instantiates an IPTV client control utility on the second device 36. The utility executed on the second device 36, at state 60, sends a request to the proxy server 34, which returns (62) a response in a suitable language, such as hypertext markup language (HTML) with JavaScript for the second device 36 to execute in accordance with description below. This JavaScript makes asynchronous JavaScript and extended markup language (XML) (AJAX) calls, or other formats in other implementations, to the proxy server and to the IPTV client to obtain information to control the IPTV client. It is noted that state 60 is only needed in implementations that use a downloadable HTML application for the second display software. The behavior of the JavaScript applies to implementations that are built using JavaScript. In another embodiment, step 60 may not be necessary where other client application implementations are used, such as one where the client application is not downloaded each time it is used. It should also be noted that other technologies (e.g. C, C++, Perl, and Flash) can be used for the implementation of the client application and that neither HTML nor JavaScript are required.

With more specificity, at state 64 using the JavaScript (or other suitable language) received from the proxy server 34 the second device 36 prompts the user to input to the second device 36 the account login information, including, e.g., the same user name and password that the IPTV client device provided to the management server 30 at 54. Thus, the servers 30, 32, 34 communicate necessary account information between them as needed to realize present principles.

At state 66 the proxy server 34, responsive to a correct user name and password from the second device 36, returns information about all IPTV clients 12 that are affiliated with the user account, including their local IP addresses which were stored by the management server 30 after login at 54 (and subsequently provided to the proxy server 34).

When the user inputs to the second device 36 at state 68 a selected IPTV client (in this example, the IPTV client 12) to use with the second device, the second device 36, using the local IP address returned at state 66, accesses the IPTV client 12 directly. The second device 36 requests device information about the IPTV client device 12 at state 70, including language information, rating information, digital rights management (DRM) information, etc. as desired, which information is returned from the IPTV client 12 to the second device 36 at state 72. Since the second device 36 knows the IP address of the IPTV client 12 and consequently communicates directly with the IPTV client 12, the second device 36 communicates using a local web address of the IPTV client 12 that need not be globally addressable, and may so communicate as long as the second device 36 and IPTV client 12 are on the same local network. It is noted that in state 70, the communication from the second device to the primary device may go through an external server in some implementations, which will allow the system to operate in environments where the primary device is not reachable by the second device due to the network configuration.

At state 74 the second device 36 sends the client information received at state 72 to the proxy server 34, requesting a list of services available to the IPTV client 12 from one or more of the content servers 32. The proxy server 34, which may be a remote or local server, relays the request for a list of services at state 76 to the management server 30, which returns the requested service list at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the service at state 86 of the content server 32 providing the selected service. At state 88 the content server 32 provides to the proxy server 34 a service session token for the particular content server 34. State 90 indicates that if desired the proxy server 34 may also request a list of content and categories of the content server 32, and the list is returned at state 92 in, e.g., extended markup language (XML) format to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client device 12 to play the selection. At state 100 the IPTV client 12 then requests service information of the management server 30 information about the service the selected asset is in, logging in to the service if required. The requested information is returned from the management server 30 to the IPTV client 12 at state 102, and when the IPTV client 12 receives the asset information it plays the asset at state 116. Note that if the IPTV client is already playing content the new content commanded to be played by the second device is placed in a queue in the IPTV client and played when the current content completes.

Note further that the second device may command the IPTV client to play content by sending to the IPTV client over the home network commands coded as if they were sent from an infrared remote control (IR RC), specifically for example the commands may be in Sony Infrared Remote Control System (SIRCS) protocol. The second device may transmit command signals to the IPTV client to control the electronic device 29.

As shown in FIG. 2, if desired, temporally between states 102 and 106 a series of messages may be exchanged between the IPTV client 12 and the content server 32. For example, a request for content information may be made (104) by the IPTV client 12 and returned (106) by the content server 32. The above-described logging into the service may be relayed by the IPTV client 12 to the content server 32 at state 108 and a service session token returned to the IPTV client at state 110 along with the before-mentioned asset information. Also, a request of content information may be made (112) and a playlist returned to (114) the IPTV client 12.

The software (e.g., JavaScript/HTML software) that is downloaded at state 62 can be made available to all electronic vendors who wish their users to be able to navigate, browse, and search IPTV content on a second device.

The following situations illustrate some scenarios where the second device complements the IPTV's shortcomings, hence providing better user experience for the IPTV user. For example, a group of friends is watching video clips on an IPTV. Each of them are browsing content on their own second display and queuing up selections. In another example, someone is looking for content on a particular subject. They are able to quickly type in search terms using their second device even when those terms contain characters not supported by their IPTV. In another example, a man is watching the end of a ball game on the IPTV while his wife uses a second display to select a movie for them to watch when the game ends. In another example, a user may be away from an IPTV, but the user may use a smart phone as the second device to browse contents and select a preferable content to be played on the IPTV.

In the above-identified situations, using a second device can provide many benefits, such as:

Browsing in own language without disturbing the big screen
  Ease of data entry in a language not supported by the IPTV
  On-device service affiliation for premium services like Netflix
  Cross-device playback and resume from a recently viewed list
  Social sharing of content to enhance content proliferation
  Management of subscription-based services from a single location
  Browsing and queue management on the move
  One-click Customer service without the need of entering personal or device information
  Quick access to relevant device specifications and manuals
  Hyper-linked text in forms directs users to informational sites
  Content Queue across devices, such as adding a content to a list, searching for a list, and playing a content in a list
  Advertisement revenue through Second display usage The second device provides an enhanced user experience of the IPTV without adding to the hardware costs of the unit. IPTV makes data entry easy and allows users to browse content on the side. Embodiments of the present invention provide a global solution which connects various IPTVs together in a cohesive manner through its potential of initiating playback across devices. Embodiments of the present invention also provide the highest level of customer service to users through its one-click customer service feature, where users do not even need to provide any device information which can be difficult to retrieve in the event of a device breakdown.

Figure 3:
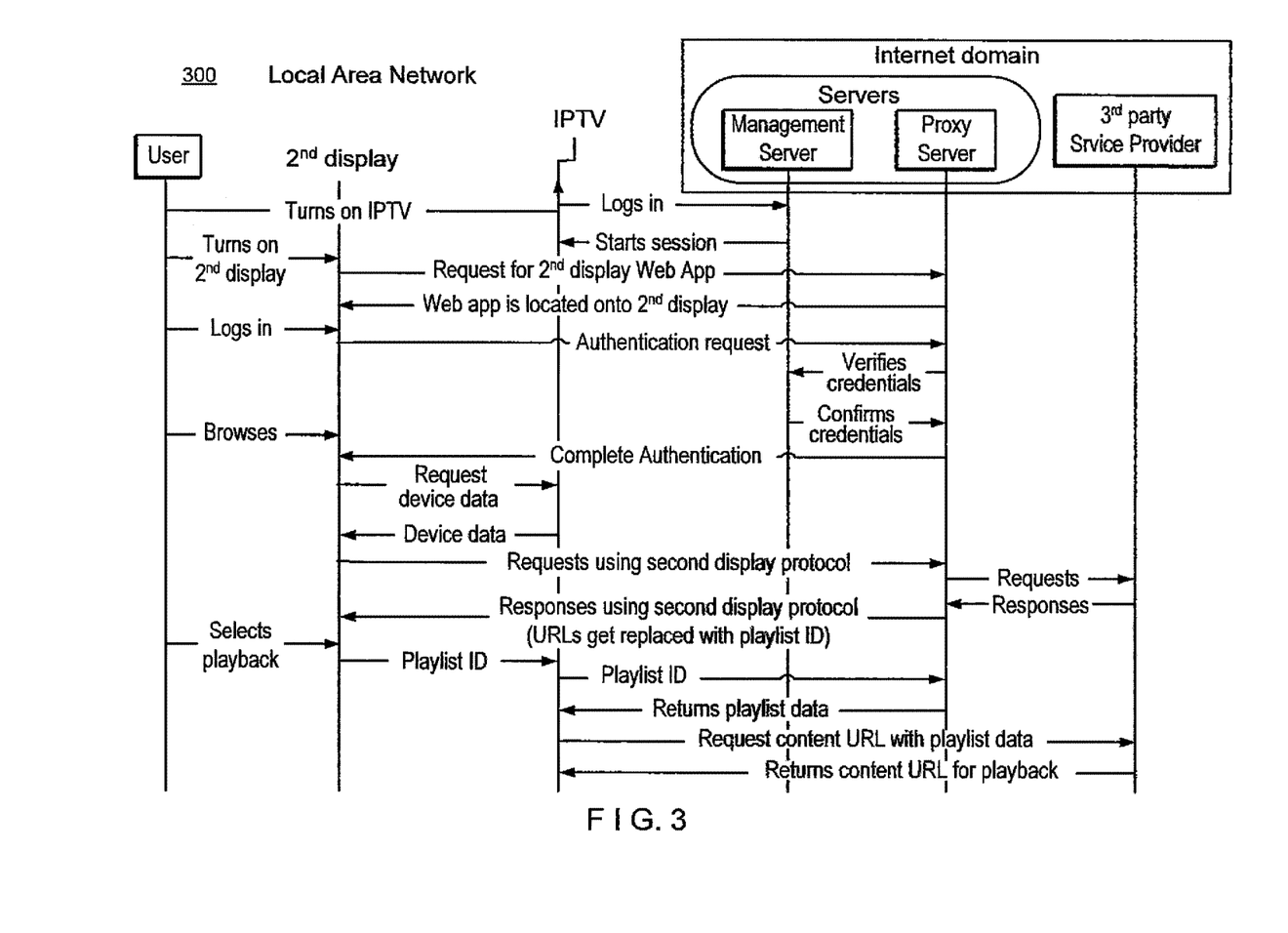
FIG. 3 shows a schematic representation of an embodiment of the present invention.

FIG. 3 shows a schematic representation 300 of an embodiment in which the present invention finds ready application. First a user turns on an IPTV client device. After the user logs in on IPTV into the manager server using device credentials a session is started. Then the user turns on the second display device, and sends a request for a second display application (app) to the proxy server (this can be a remote or local server). The second display application (native/interpreted application) is loaded onto the second display device. Then the user logs into the second display application using account information. This account is the same account used for IPTV to log in as described above (however, this is not the same account credential). An authentication request is sent from the second display to the proxy server. The proxy server verifies credentials with the management server, and then the management server confirms credentials with the proxy server. So that authentication is completed.

Then the user browses an Internet video link (IVL). After that, the device data is requested from the second display and then the requested device data is sent from IPTV client device to the second display. The second display sends a request using second display protocol to the proxy server, and then the proxy server requests to service provider, and the service provider responds. The proxy server responds using a second display protocol to the second display with the associated URL replaced with playlist ID.

After the user selects playback, the playlist ID is sent from the second display to the IPTV client. Then the playlist ID is sent from the IPTV client to the proxy server, and playlist data is returned from the proxy server to the IPTV client. The IPTV client requests a content URL with playlist data of the service provider, and then the service provider returns the content URL for playback to the IPTV client.

When the IPTV client device is not reachable, the playlist ID is not received and the second display device notifies the user that the IPTV client device is not reachable. The second display device stores the Playlist ID for a later attempt at sending to the IPTV client device.

In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4:
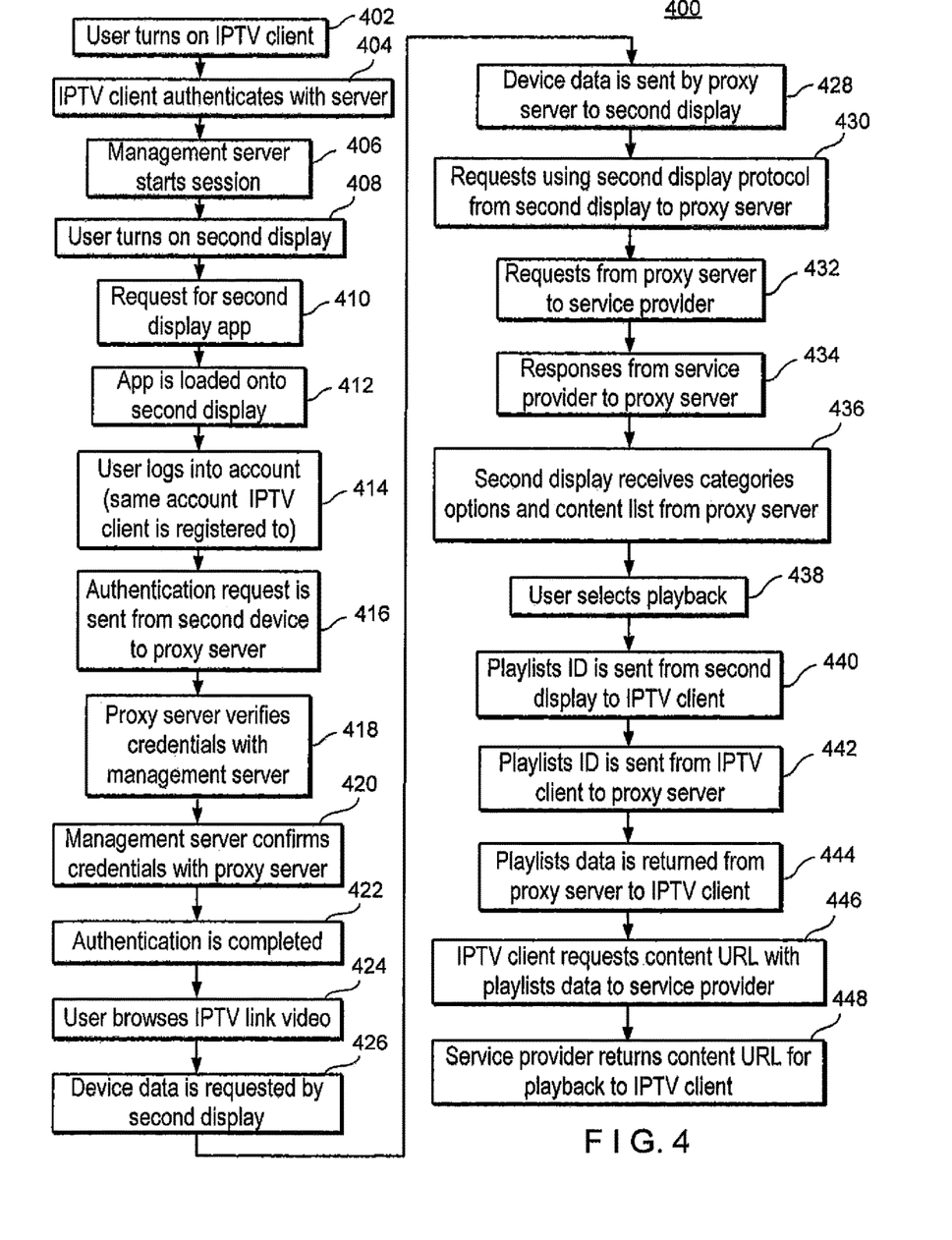
FIG. 4 shows a flow chart of processing steps according to an embodiment of the present invention.

FIG. 4 shows a flow chart 400 of processing steps according to the embodiment of FIG. 3.

The process begins in step 402 in which the user turns on IPTV client device. After the IPTV client device is registered with the management server, or authenticated with the management server, as shown in step 404, the management server starts the session in step 406. Then in step 408 the user turns on the second display, and, when necessary, requests for second display application to a proxy server, as shown in step 410. The request for the second display application is optional. In some embodiments of the present invention, the second display will receive the second display application every time the application is started, while it is also an embodiment of the present invention that the second display device will not receive the second display application or only on a software update. When requested, the second display application is loaded onto second display, as shown in step 412. In step 414 the user logs into the account, which is the account the IPTV device is registered to. In step 416 an authentication request is sent from the second display to the proxy server, which may be a local server or remote server. In step 418 the proxy server verifies credentials with the management server, and then in step 420 the management server confirms credentials with the proxy server. In step 422 authentication is completed. It is an embodiment of the present invention that the server in steps 418 and 420 may be in the same server. Alternatively, there may be more than two servers splitting the server tasks.

The process proceeds to step 424, in which the user is presented with a list of IPTV devices affiliated with, or associated with, the secondary display device via the user account. Then, as shown in step 426, when a user selects a particular IPTV device to communicate with. This communication may be, for example, that an application program interface (API) call may be sent to the selected IPTV device. Device data, describing the second display is requested by the second display device and, as shown in step 428, the requested device data is sent by the proxy server to the second display device, this information may include information specific to the IPTV device such as content rating permitted by that device, language, etc. In an embodiment in which the user has already selected an IPTV device in a previous session, an API call may be sent to that IPTV device to obtain device information without the user making a request. Also, according to an embodiment of the present invention, the user may set a particular IPTV device as the default device in a list of IPTV devices. The process then moves to step 430 in which the second display device makes requests using a second display API to the proxy server for options, categories and content list, and then, as shown in step 432, requests from the proxy server are sent to the service provider and the service provider responds with options, categories and content list, as shown in step 434. The process then moves to step 436, which shows that the second display device receives categories, options and a content list from the proxy server. Alternatively, the proxy server may send to the second display device the playlist ID associated with the address, which may be a URL to replace that URL with the playlist ID. Alternatively, the service provider may permit, in some cases, that the URL be sent to the second display device. For example, the second display may have a secure application, and the service provider may allow a second display device with a secure application to receive the URL. Thus, the content URL may be transmitted to the IPTV device for playback, rather than having the IPTV device retrieve the data from the server.

The process then moves to step 438 in which the user selects content for playback and a playlist is created for that content and stored in the proxy server. Then in step 440 a playlist ID is sent from the second display device to the IPTV client device. If the IPTV client does not answer or does not acknowledge the request to play the content, or is unable to play the content at the time, such as when the IPTV client device may be on and reachable, but a viewer has enacted a "do not disturb" mode, the second display device informs the user that the IPTV client device is unreachable (not available to play the content at this time) and queues the request to be repeated at a later time when the IPTV client device is reachable. In step 442 the playlist ID is sent from IPTV client to proxy server, and returned from proxy server to IPTV client in step 444. In step 446 IPTV client requests content URL with playlist data to service provider, and then in step 448 the service provider returns content URL for playback to the IPTV client. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start.

Figure 5:
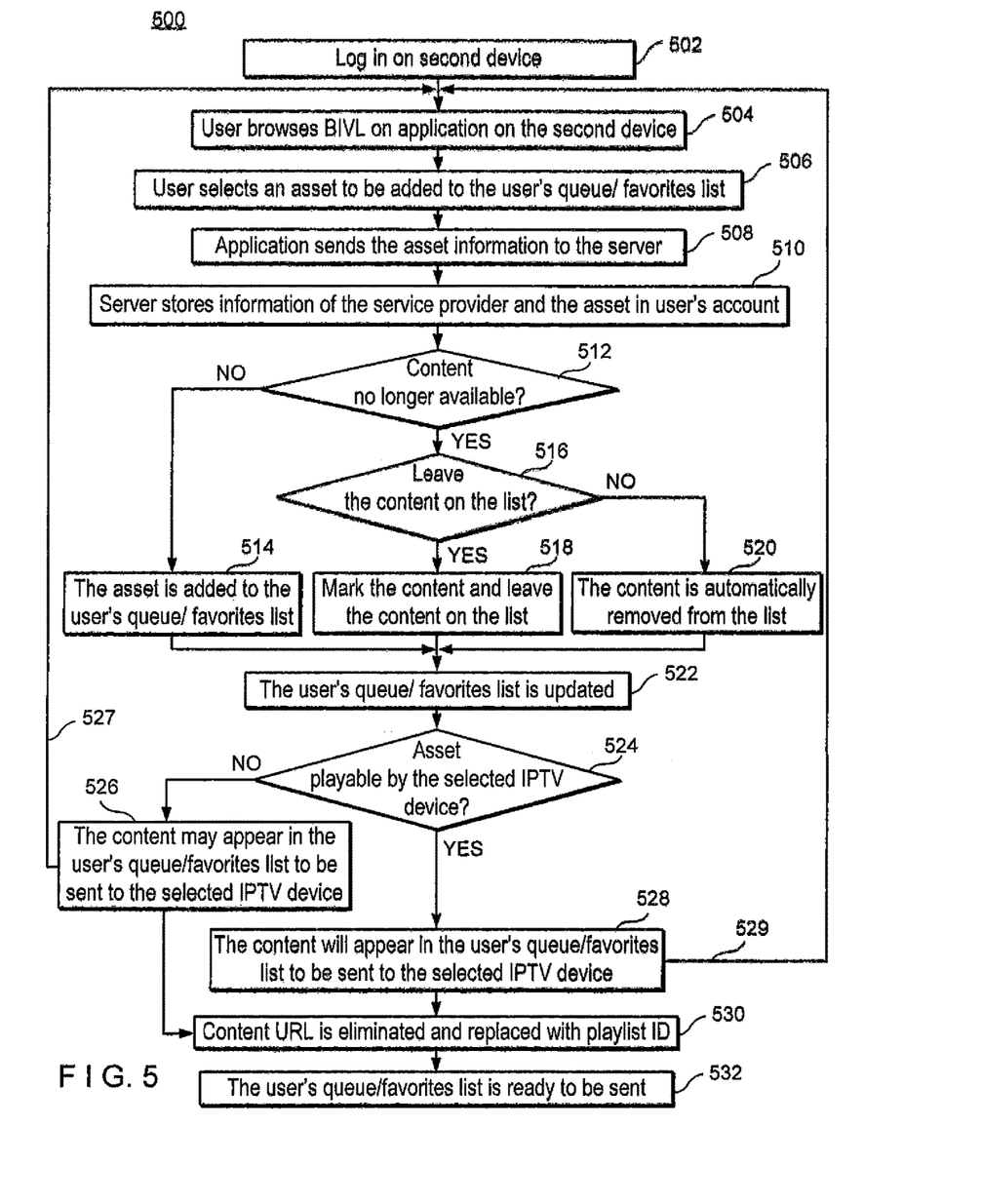
FIG. 5 illustrates an example of steps of creating a user's queue/favorites list according to an embodiment of the present invention.

FIG. 5 illustrates an example of steps of creating a user's queue/favorites list according to an embodiment of the present invention. As shown in FIG. 5, the process 500 begins in step 502 in which a user, who can access a first IPTV device and a secondary device, which may be an IPTV device or a non-IPTV device, logs in using the secondary device. The process then proceeds to step 504 which shows that the user searches for content that may be stored at a remote location, and/or browses Internet video link (IVL) using an application, for example, a web application that is downloaded when it is executed, on the secondary device. The process then proceeds to step 506, which shows that the user may select content, or an asset, provided by a service provider, to be added to his queue or favorites list. The process then proceeds to step 508 in which the application sends the content or asset information to a server. This information may be an identifier, or a reference ID, that specifies the selected content, or asset.

The process then moves to step 510, which shows that the server stores particular data related to the service provider, together with the content or asset, and the stored information includes authentication details with the service provider and the content or asset details that are used for playback on the IPTV device. This information is stored in the user's account, instead of the device's account. Thus, once the user logs into his/her account from any permitted device(s), he/she can manage a common list across all the associated devices. When this information is stored, the content will be available to all devices associated with, or linked to, the user's account. In an alternate embodiment, steps 502-510 may be a separate program code module, or independent algorithm that could be used to add an asset to a list using a second display.

The process then proceeds to step 512 where a determination is made whether the content, or the asset, is no longer available. If the content or asset is not available anymore, the process proceeds according to the "yes" line and reaches step 516 which shows that the user determines whether to leave the content, or the asset, on the list. If the user wishes to keep the content, or the asset, on the list, the process proceeds according to "yes" line to reach step 518 in which the content, or asset, is marked as "Not currently available" or "Not available on the current device", and the content is left on the list, and then the user's queue/favorites list is updated, as shown in step 522. Thus, the content, or asset, is retained in an instance when the content, or asset, may be available at a later time, for example if the user were to renew an expired subscription or affiliate a device to enable the device to have access to the content. In an instance when the user determines not to leave the content, or asset on the list, the process proceeds according to "no" line, which shows that step 520 is reached. Step 520 shows that the content, or asset, will be automatically removed from the list reflects content, or assets, that the wishes to have listed. Referring back to step 512, if the content, or asset, is still available, the process proceeds according to "no" line, which shows that step 514 is reached, which shows that the asset is added to the user's queue/favorites list.

The process then proceeds to step 522 in which the user's queue/favorites list is updated. The process then proceeds to step 524 where a determination is made whether the requested asset is playable by a selected IPTV device. If the outcome of the determination is that the requested asset is not playable, the process proceeds according to "no" line, which shows that step 526 is reached in which the content, or asset, may or may not appear in the user's queue/favorites list that is sent to the selected IPTV device, even though playback of that content, or asset, on the selected IPTV device will not be possible. This filtering is done automatically so that the user does not have to manage the updating process. Line 527 shows that after step 526, step 504 is reached, in which a user can select another asset. If the content is playable by the selected IPTV device, the process proceeds according to the "yes" line, in which the process proceeds to step 528 in which the content, or asset, will appear in the user's queue/favorites list to be sent to the selected IPTV device. Therefore, although multiple IPTV devices can be accessed by the same user, the queue/favorites list on each IPTV device may be different according to the services available to the device. After step 528, line 529 shows that step 504 is reached in which another asset may be selected. In an alternate embodiment, steps 512-528 could be a separate program module to update a list based on the availability of the assets on the list.

In one embodiment of the present invention, the process proceeds to step 530, in which the address or location of the content, which may be, for example, a uniform resource locator (URL) or uniform resource indicator (URI), is eliminated and the address or location is replaced with a reference ID, which is used by the IPTV device to retrieve playback information. By eliminating the location or address of the content (e.g., URL or URI) being displayed on the second display device, the risk of leaking major proprietary information is reduced. Thus the possibility of losses of security and/or data is reduced. Alternatively, step 530 may be skipped and the process proceeds to step 532, which shows that the user's queue/favorites list is ready to be sent from the server to a user device, such as a secondary device or IPTV device.

Figure 6:
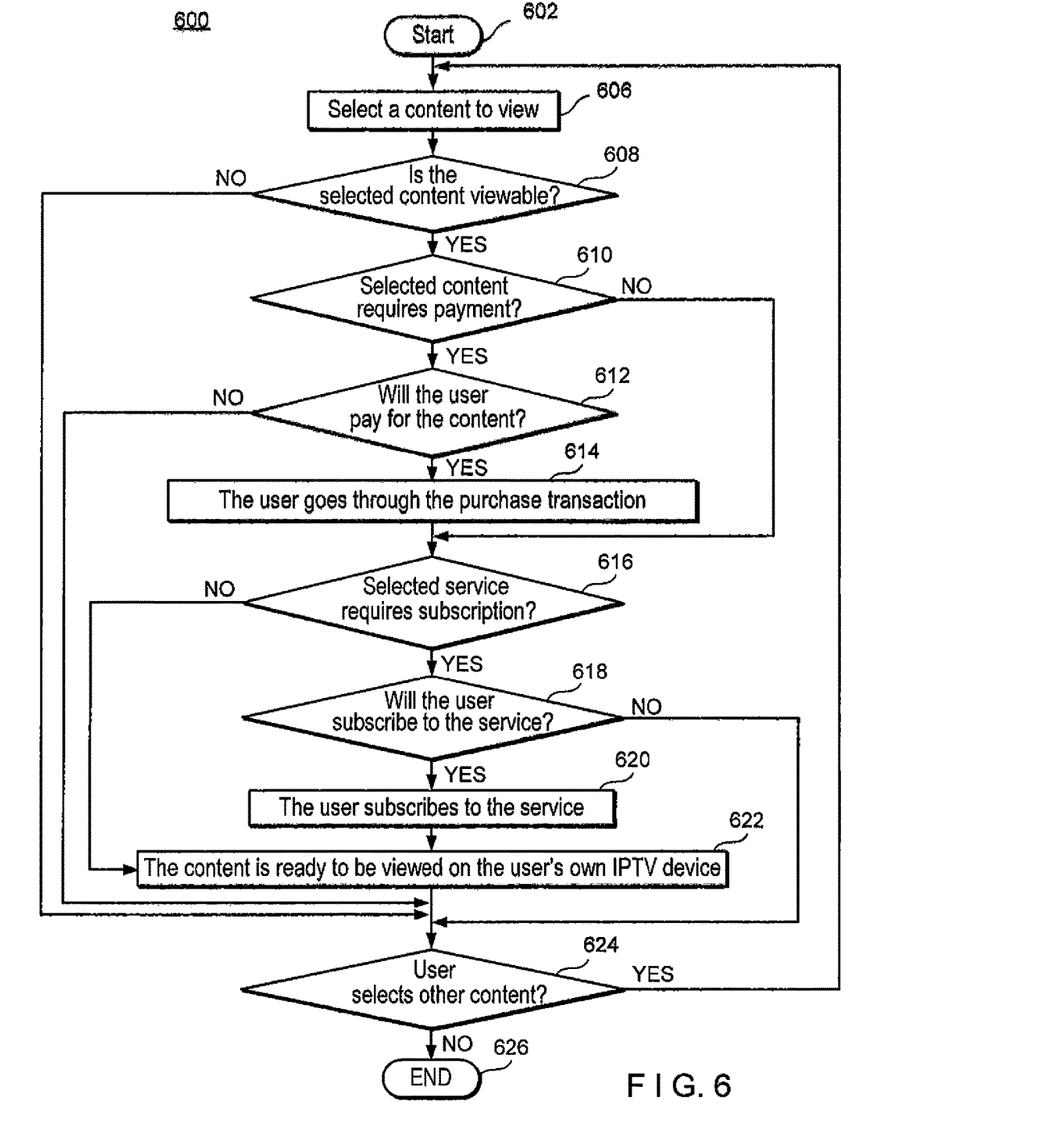
FIG. 6 illustrates an example of steps for a user to play an item from a list created by another user according to an embodiment of the present invention.

FIG. 6 illustrates an example of steps 600 for a user to play an item from a list created by another user according to an embodiment of the present invention. As shown in FIG. 6, each user may have a plurality of public lists of content and a plurality of private lists of content.

Specifically, as shown in FIG. 6, the process for a user to play an item from a list created by another user, or alternatively, to subscribe to another user's public list begins with start step 602. The process then proceeds to step 606, in which the user selects content to view. The process proceeds to step 608 in which a determination is made whether the selected content is viewable by the user's device. Because any number of limitations, such as rating settings, supported protocols and codecs, and country by country restrictions, may prevent the selected piece of content from being playable on the user's device. If the result of the determination of step 608 is negative, meaning that the selected content is not viewable, "no" line shows that the process reaches step 624 in which the user determines whether or not to select other content. If the user still wants to select other content, the process proceeds according to the "yes" line, which shows that step 606 is reached, otherwise the process proceeds according to the "no" line, which shows that end step 626 is reached.

Returning to step 608, which shows that if the selected content is determined to be viewable by the user's device, the process proceeds according to the "yes" line, which shows that step 610 is reached in which a determination is made whether the selected content requires payment. If the determination of step 610 is affirmative, meaning that payment is required, the process proceeds according to the "yes" line, which shows that step 612 is reached, in which the user determines whether or not to pay for the content. If the user will pay for the content, the process proceeds according to the "yes" line, which shows that step 614 is reached in which the user goes through the purchase transaction. If the user will not pay for the content, the process proceeds according to the "no" line, which shows that step 624 is reached in which the user determines whether or not to select other content, as described above.

Referring back to step 610, if the selected content does not require payment, the process proceeds according to the "no" line, which leads to step 616 in which a determination is made whether the selected service requires a subscription. If the service requires subscription, the process proceeds according to the "yes" line, which leads to step 618 in which the user determines whether or not to subscribe to the service. If the user decides to subscribe, the process proceeds according to the "yes" line, which leads to step 620 in which the user subscribes to the selected service. If the user does not subscribe to the service, the process proceeds according to the "no" line, which leads to step 624.

Referring back to step 616, if the selected service does not require subscription, the process proceeds according to the "no" line, which leads to step 622 in which the content is ready to be viewed on the user's selected IPTV device. As shown in step 624, as described above, if the user determines not to select other content, the process proceeds according to the "no" line, which leads to end step 626.

Figure 7:
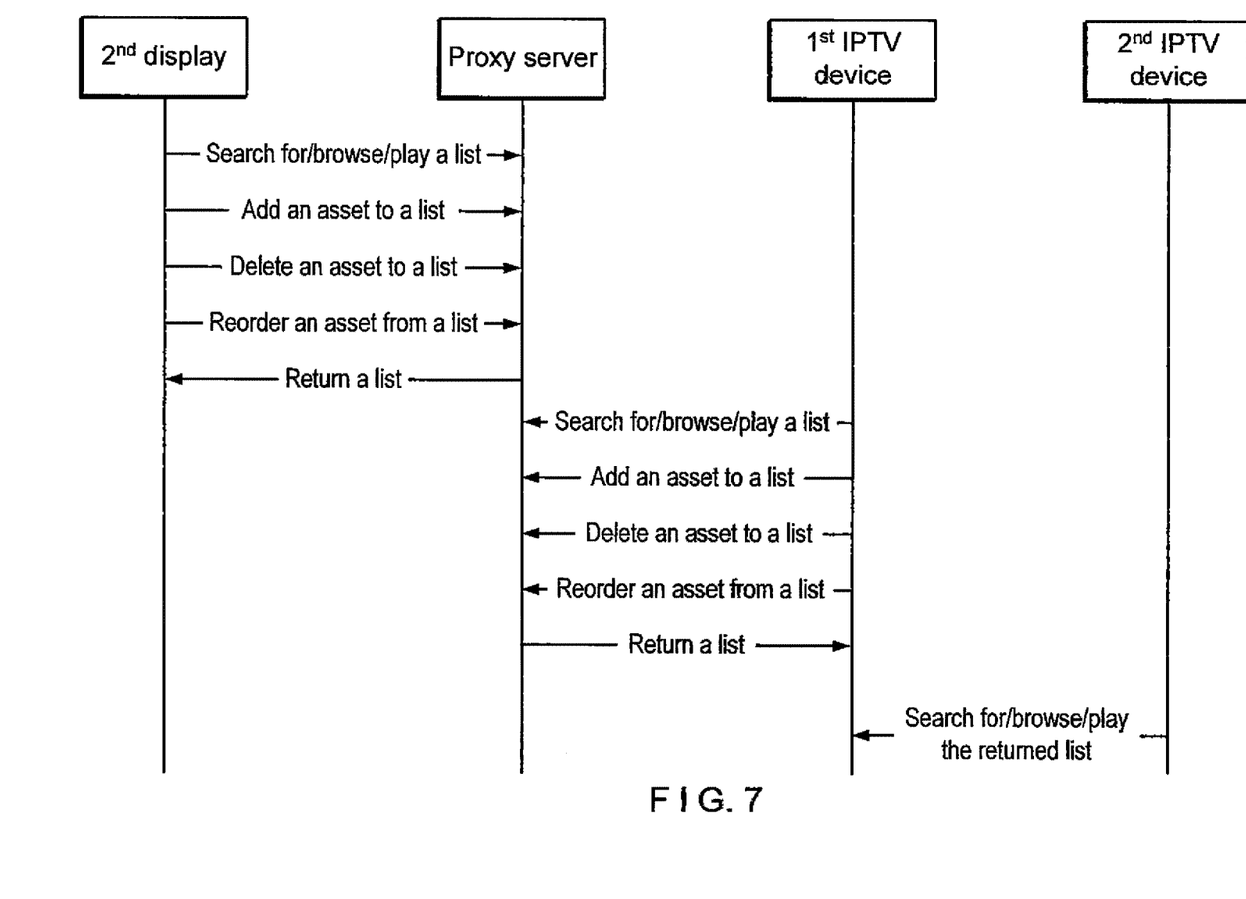
FIG. 7 shows a schematic representation of an embodiment of the present invention.

FIG. 7 shows a schematic representation of an embodiment of the present invention. As shown in FIG. 7, the user may search for/browse/play a list using the second display, and the list may be returned to the second display upon request. The user may also add an asset to a list, delete an asset from a list, and reorder an asset using the second display.

As shown in FIG. 7, the user may search for/browse/play a list using a first IPTV device, and the list may be returned to the first IPTV device upon request. And the user may also add an asset to a list, delete an asset from a list, and reorder an asset using the first IPTV device.

FIG. 7 also shows that after a content list is returned to the first IPTV device, a user may use the content list, for example, searching for/browsing/playing the content list, on a second IPTV device without using a second display. It is noted that the content is provided from multiple providers, instead of being aggregated by a common carrier such as a cable or satellite feed.

It is an embodiment of the present invention that the IPTV devices and second display devices may be different types of devices and the devices may be in different networks and might be in different regions or countries. In such an embodiment, the IPTV devices and the second display devices may communicate with each other via a network or protocols.

It is also an embodiment of the present invention that the same content list may be used on multiple IPTV devices. Therefore, when a content list is modified on a first IPTV device, those changes may be reflected when that list is used on a second IPTV device.

It is also an embodiment of the present invention that the plurality of IPTV devices do not need to communicate with each other, as they may coordinate through a server since the list is associated with the user's account instead of a device.

It is another embodiment of the present invention that a list can be played as a list instead of having the user navigate through the content in the list and manually select content to be played. There may be multiple playback modes, for example, single playback mode, continuous playback mode, shuffle playback mode, etc., for playing a list and a user can select to play a list instead of simply playing content they navigated to within the list.

It is another embodiment of the present invention that a user can have multiple lists, including system created lists, such as favorite lists, lists saved for later, etc., and user created lists which is named by the user.

It is also an embodiment of the present invention that the system may automatically maintain a "Sent by friends" list for each user to collect content references that friends send to them. The meta-data for these list items may include optional comments from the other user who sent the content reference.

Another embodiment of the present invention is directed to a method for identifying content using one or more IPTV devices. This method includes accessing a user's account using a secondary device and selecting content provided by a service provider. Content is added to a list of content using the secondary device and the content list is navigated to by utilizing an IPTV device. The selected content is manipulated on the IPTV device, such that during the time of manipulation on the IPTV device, the secondary device or another IPTV device is operable to browse further content.

Another embodiment is directed to a method for identifying content using one or more IPTV devices, the method includes: selecting content provided by a service provider; manipulating the selected content on a first IPTV device; and manipulating the selected content utilizing a second IPTV device.

Another embodiment also includes the method for identifying content that also includes: accessing a user's account using a secondary device; and manipulating the selected content using the secondary device.

Furthermore, the manipulation includes playing the selected content

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for identifying content using one or more IPTV devices, the method comprising:
   accessing a user's account using a secondary device;
   selecting content provided by a service provider;
   sending an identifier, from the service provider, specifying the selected content to a first IPTV device that is selected to manipulate the selected content; and
   manipulating the selected content on the first IPTV device,
   wherein during the time of manipulation on the first IPTV device, the secondary device or another IPTV device is operable to manipulate other content, and
   wherein the method further comprises setting up a direct communication between the first IPTV device and the secondary device by:
   storing a local IP address of the first IPTV device in a proxy server;
   sending the stored local IP address of the first IPTV device from the proxy server to the secondary device after the secondary device is authenticated by the proxy server; and
   the secondary device directly accessing the first IPTV device via the local IP address,
   wherein the user's account has a public content list that accepts subscriptions from all IPTV devices associated with the user's account, and the method further determines whether a content in the public content list is viewable by an IPTV device.

2. The method according to claim 1, further comprising:
   using the secondary device to select the first IPTV device, from a plurality of IPTV devices associated with the user's account, to play the selected content.

3. The method according to claim 1, further comprising:
   sending the selected content in a form of a reference ID that excludes information identifying a location of the selected content.

4. The method according to claim 3,
   wherein the location of the selected content is a uniform resource locator (URL) or a uniform resource identifier (URI).

5. The method according to claim 1,
   wherein the user's content list includes content provided by a plurality service providers.

6. The method according to claim 5,
   wherein the user's content list includes dynamic content that is updated by the plurality of service providers.

7. The method according to claim 5,
   wherein the user is one of the plurality of service providers that hosts content stored in the user's account.

8. The method according to claim 1, further comprising:
storing information of the service provider and the selected content in the user's account,
wherein the stored information of the service provider includes content details used for playback on the first IPTV device, and
wherein after the information of the service provider and the selected content is stored in the user's account, the stored content is available to each of the one or more IPTV devices associated with the user's account.

9. The method according to claim 1, wherein the selecting step further comprise:
identifying previous selections associated with the user's account.

10. The method according to claim 1, further comprising:
adding the selected content to a user's content list in the user's account.

11. The method according to claim 1,
wherein modification to the user's content list is stored in the user's account, and the stored modification is reflected on each IPTV device where the user's content list is used.

12. The method according to claim 1, further comprising:
playing the user's content list.

13. The method according to claim 12,
wherein the user's content list is played in multiple playback modes including single playback mode, continuous playback mode and shuffle playback mode.

14. The method according to claim 1,
wherein the user has a plurality of content lists.

15. The method according to claim 14,
wherein the plurality of content lists includes a recommendation content list which contains content references sent from other users.

16. The method according to claim 15,
wherein meta data for the recommendation content list includes optional comments from the other users.

17. A method for identifying content using one or more IPTV devices, the method comprising:
accessing a user's account using a secondary device;
selecting content provided by a service provider;
adding content to a list of content using the secondary device;
navigating to the content list utilizing an IPTV device; and
manipulating the selected content on the IPTV device,
wherein during the time of manipulation on the IPTV device, the secondary device or another IPTV device is operable to browse further content, and
wherein the method further comprises setting up a direct communication between the first IPTV device and the secondary device by:
storing a local IP address of the first IPTV device in a proxy server;
sending the stored local IP address of the first IPTV device from the proxy server to the secondary device after the secondary device is authenticated by the proxy server; and
the secondary device directly accessing the first IPTV device via the local IP address, and
wherein the user's account has a public content list that accepts subscriptions from all IPTV devices associated with the user's account, and the method further determines whether a content in the public content list is viewable by an IPTV device.

18. A method for identifying content using one or more IPTV devices, the method comprising:
selecting content provided by a service provider;
manipulating the selected content on a first IPTV device; and
manipulating the selected content utilizing a second IPTV device, and
wherein the method further comprises setting up a direct communication between the first IPTV device and the secondary device by:
storing a local IP address of the first IPTV device in a proxy server;
sending the stored local IP address of the first IPTV device from the proxy server to the secondary device after the secondary device is authenticated by the proxy server; and
the secondary device directly accessing the first IPTV device via the local IP address, and
wherein the method further comprises providing a plurality of user accounts, each user account having a public content list that accepts subscriptions from all IPTV devices associated with the user's account, and the method further determines whether a content in the public content list is viewable by an IPTV device.

19. The method according to claim 18, further comprising:
accessing a user's account using a secondary device; and
manipulating the selected content using the secondary device.

20. The method according to claim 19, wherein the manipulation performed by the secondary device includes playback of the selected content on one or more of the IPTV devices.

* * * * *